United States Patent [19]

Wes Berry

[11] Patent Number: 4,734,200

[45] Date of Patent: Mar. 29, 1988

[54] PROCESS FOR REMOVAL OF FLUORIDE AND PHOSPHORUS-TYPE CONTAMINANTS FROM ACIDIC WASTEWATER

[75] Inventor: W. Wes Berry, Lakeland, Fla.

[73] Assignee: Advanced Separation Technologies Incorporated, Lakeland, Fla.

[21] Appl. No.: 848,130

[22] Filed: Apr. 4, 1986

[51] Int. Cl.$^4$ ............................................... C02F 1/42
[52] U.S. Cl. ..................................... 210/677; 210/683
[58] Field of Search ............... 210/669, 670, 683, 267, 210/677; 423/341

[56] References Cited

U.S. PATENT DOCUMENTS 4,056,605 11/1977 Vulikh et al. ...................... 423/341
4,522,726 6/1985 Berry et al. ......................... 210/267

Primary Examiner—Ivars Cintins
Attorney, Agent, or Firm—Burns, Doane, Swecker & Mathis

[57] ABSTRACT

A process for treating acidic process waste water containing $SiF_6^{2-}$ is disclosed. The process is carried out by contacting the waste water with a strong base ion exchange resin and loading $SiF_6^{2-}$ onto the resin. Phosphate ions are then removed from the waste water by raising the pH of the waste water to between about 5.0 and 7.0 and contacting the waste water with a strong base ion exchange resin and loading phosphate ions onto the resin.

20 Claims, 4 Drawing Figures

[4,734,200]

PROCESS FOR REMOVAL OF FLUORIDE AND PHOSPHORUS-TYPE CONTAMINANTS FROM ACIDIC WASTEWATER

BACKGROUND OF THE INVENTION

The present invention relates to an ion exchange process and more particularly to a process for the removal of fluoride and phosphorus-type contaminants from acidic process waste waters such as those encountered in conventional wet-process phosphoric acid processing facilities.

In the production of wet-process phosphoric acid, large cooling and gypsum storage ponds are typically employed. More specifically, large amounts of water are circulated and reused in the phosphoric acid processing and a great deal of effort is undertaken in order to utilize this water to the fullest extent possible.

Since the above-described waste water often contains high levels of both fluoride and phosphorus-type contaminants, its disposal has proven to be difficult. Typically, expensive liming processes have been used. Specifically, a two-stage liming system has been employed wherein lime is first added to the pond water to raise the pH to between about 4 and about 5 thereby precipitating the fluoride compounds. The slurry is then clarified and the water treated once again with lime to raise the pH to about 9 for removal of the phosphorus compounds. While somewhat effective, the costs of such a removal system are prohibitive since the fluoride and phosphorus type contamnants, which precipitate upon addition of the lime, are disposed as a sludge which is very diffcult to handle and adds a substantial amount of cost to the purification process. Additionally, the disposal of the fluoride and phosphorus type compounds with the sludge precludes their recovery as potentially valuable commercial products and thus further detracts from the desirability of the two-stage liming. Thus, the conventional two-stage liming processes are not only very difficult to carry out, but also result in the disposal of potentially valuable end products namely, fluoride and phosphorus type compounds.

SUMMARY AND OBJECTS OF THE INVENTION

In view of the foregoing limitations and shortcomings of prior art processes for removing fluoride and phosphorus type contaminants from acidic process waste waters as well as other disadvantages not specifically mentioned above, it should be apparent that there still exists a need in the art for a process which enables the efficient removal of the above contaminants from acidic waste waters and allows these contaminants to be recovered as commercially useful end products. It is, therefore, a primary objective of the present invention to fulfill that need by providing an ion exchange process wherein a strong base ion exchange resin is used to remove fluorides and phosphorus type contaminants from acidic process waste waters such as those encountered in conventional wet-process phosphoric acid processing facilities.

It is a further object of this invention to provide a process for removing fluoride and phosphorus-type contaminants from waste water which will reduce the overall amount of water which is required.

Another obiect of this invention is to provide a process for removing fluoride and phosphorus-type contaminants from waste water which enables recovery of those contaminants as useful bi-products.

Yet another object of this invention is to provide a process for the removal of fluoride and phosphorus-type contaminants from acidic process waste waters utilizing an Advanced Separation Device which enables the contaminants to be recovered at a greater degree of efficiency than heretofore possible.

Briefly described those and other objects of the invention are accomplished by providing a process for removing fluorides and/or phosphorus-type compounds from acidic waste water comprising the step of contacting said waste water with a strong base ion exchange resin which has unexpectedly been observed to remove fluoride-containing ions such as $SiF_6^{2-}$ in an acidic medium, i.e., at pH levels between about 1.5 and 2.0. The resin loaded with fluoride is then regenerated by contacting it with a fluoride-resin regeneration fluid which strips the fluoride from the resin in the form of a water soluble fluoride-containing salt. By then raising the pH of the waste water effluent, containing substantially depleted levels of fluoride-containing ion, to between about 5.0 and 7.0, a phosphorus type contaminant such as $HPO_4^{2-}$ may be removed from the waste water. As with the fluoride-containing component, the resin loaded with the phosphorus type compound may be regenerated with a composition which will yield a water-soluble phosphate salt.

Both of the above-described steps are most advantageously carried out in the Advance Separation Device (ASD), described hereinafter, which enables the ion exchange process to be carried out continuously and at optimum efficiency.

With the foregoing and other objects, advantages, and features of the invention that will become hereinafter apparent, the nature of the invention will be more clearly understood by reference to the following detailed description of the invention, the appended claims, and the drawings.

DETAILED DESCRIPTION OF PREFERRED EMBODIMENTS

The process described below relates to the removal of both fluoride and phosphorus-type compounds from the acidic waste water. However, it will be appreciated that the removal of both contaminants is described for illustratve purposes only to demonstrate the versatility of the present process. Accordingly, it is within the ambit of the present invention to carry out the process on waste waters containing only one of the contaminants.

The acidic waste waters treated in accordance with the present invention typically originate from processes for producing wet-process phosphoric acid. The waste waters typically have a pH ranging from about 1.5 to about 2.0 and contain about 5,000 to 10,000 parts per million of fluoride compound, 5,000 to 10,000 parts per million phosphate expressed as $P_2O_5$ and greater than 500 parts per million of ammonium on. The fluorde component is believed to be comprised primarily of $SiF_6^{2-}$. Although the process is hereinafter described in conjunction with waste water from phosphoric acid processes, it will be appreciated that it is also applicable to any process wherein $SiF_6^{2-}$ and/or phosphate are present in an acidic medium.

The waste water may be contacted with the strong base ion exchange resin by conventional contacting techniques such as fixed or pulsed beds or, most advantageously, by the ASD.

Regardless of which contacting technique is employed, the waste water is first clarified, if required, to remove suspended solids. The clarification may be carried out using conventional equipment such as a relief clarifier, a polishing filter, etc.

Figure 1:
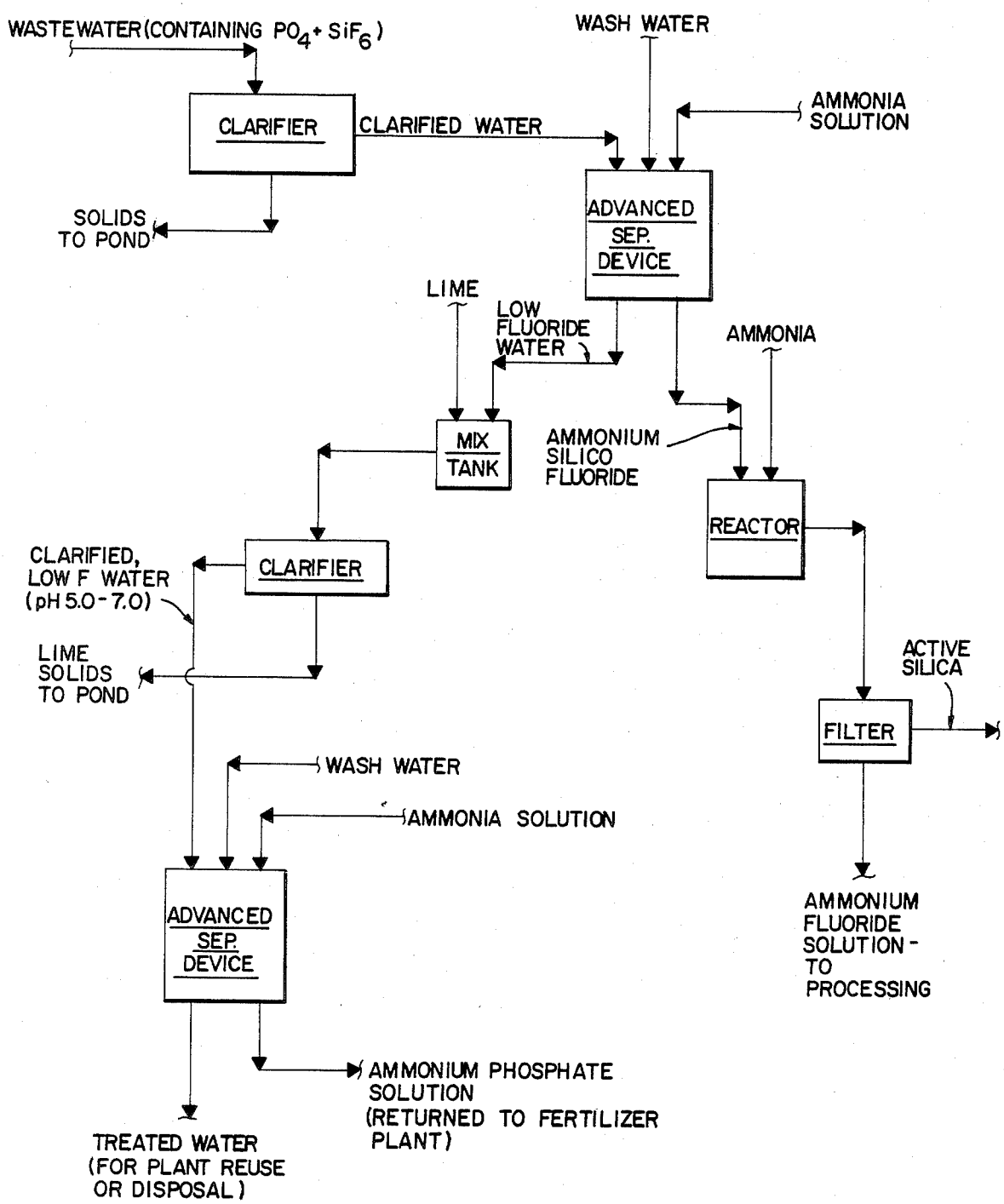
FIG. 1 is a flow diagram of the process for recovering fluoride and phosphorus compounds from acidic waste water.

As illustrated in the flow diagram of FIG. 1, the clarified water is then sent to the contacting device containing the strong base ion exchange resin. Such resins are typically employed for removing selected anions from water and/or chemical process streams, especially those containing divalent anions. Thus, it was highly unexpected that fluoride ions contained in phosphoric acid process waste waters would have a high affinity for the resins. Without being limited to theory, it is believed that the reason for this surprising result is that the fluoride ions contained in phosphoric acid process waste waters in phosphoric acid pond water tend to be in the $SiF_6^{2-}$ form and thus act as a divalent species. The fluoride ion as $SiF_6^{2-}$ is loaded onto the resin via an ion exchange. The anion associated with the strong base anion exchange resin may be any of those typically employed for such applications, the principal criteria in their selection being convenience, availability, and compatibility with regeneration media. Typical anions for such purposes include, but are not limited to hydroxide, sulfate, bisulfate, chloride, and carbonate.

A strong base ion exchange resn found advantageous is DUOLITE A101D manufactured by Rohm and Haas which has an affinity for the fluoride ion at the natural pH of the pond water to be treated, i.e., having a pH ranging from about 1.5 to about 2.0. Other suitable resins include IRA 900C and IRA 910, both of which are also manufactured by Rohm & Haas or the TG550 resin manufactured by Dow Chemical Corp.

The spent strong base ion exchange resin is washed and then regenerated with a compound which strips the fluoride from the resin and forms water soluble commercially useful end products or intermediates capable of being converted to commercially useful end products. Such compounds include, but are not limited to sulfuric acid, ammonium sulfate and ammonium bisulfate. The particular compound used is not critical so long as the fluoride salt thereby formed is water-soluble thus enabling it to be washed out of the resin. A 1 to 4 normal aqueous ammonium bisulfate solution having a pH between about 2 and about 4 has been found to be particularly advantageous since ammonium bisulfate is typically employed in the production of wet process phosphoric acid. The ammonium bisulfate strips the fluoride compound from the resin by exchanging the bisulfate ion with the $SiF_6^{2-}$ so as to form a concentrated strip solution containing ammonium silico-fluoride. The resin is then converted to the bisulfate form.

The ammonium silico-fluoride strip solution may then be reacted with additional ammonia to increase the pH to between about 8.5 and 9.0 thereby precipitating an activated silica compound. After separating the silica by conventional filtration techniques, the ammonium fluoride solution is then used as an intermediate for various commercially useful fluoride compounds such as calcium fluoride, hydrofluoric acid, metallic fluorides and the like. The treated waste water, containing depleted levels of fluoride compound i.e., less than 1000 ppm and preferably less than 50 ppm, is then further treated wth lime to raise the pH to between about 5.0 and 7.0. Since substantially all the fluoride is removed from the waste water solution and replaced with sulfate, a smaller amount of lime is required to raise the pH to 5.0 than would be required if the fluoride ion were still present. This reduces the water treatment costs.

Once the pH of the fluoride depleted water has been adjusted to the desired level, it is sent to a second contacting device for interaction with strong base ion exchange resn. At the higher pH level, however, the resin has an affinity for the phosphate anion. Substantially all the phosphate is removed so as to produce an effluent containing less than about 100 to about 200 ppm and preferably about 5.0 to 100 ppm of phosphate as $P_2O_5$. The effluent is now at a near neutral pH and contains only small amounts of fluoride and phosphorus-type compounds. This material can then be recycled to an existing operation for use as process makeup water. One particularly suitable application is to use the effluent as make-up water for the wet-rock grinding circuits employed in phosphoric acid manufacturing processes. In this manner, wet-rock grinding can be utilized in the phos-acid complex with no impact on the overall water balance. To date, this has been a major drawback for utilization of wet-rock grinding.

The spent resin, now containing bound phosphate, is then regenerated with a compound capable of forming a useful end product or intermediate of such an end product with the phosphate. As with the fluoride resin regeneration stage, the particular regeneration solution used in the phosphate resin regeneration stage is not critical so long as the product or intermediate of the product is water-soluble. Such compounds include ammonium sulfate, ammonium hydroxide, sodium sulfate and the like. Of these compounds, ammonium hydroxide is particularly advantageous. The ammonium hydroxide effects the exchange of hydroxide for the bound phosphate so as to form a regenerated hydroxide resin and ammonium phosphate. Ammonium phosphate, of course, is a valuable commercial end product.

Although the present process may be carried out in conventional fixed or pulsed beds, it is most advantageously carried out in conjunction with the ASD. More specifically, by using the ASD, a truly continuous ion exchange with superior technical and economic advantages can be achieved. The ASD is described in detail in U.S. Pat. No. 4,522,726 of common assignee, the disclosure of which is hereby incorporated by reference.

Figure 2:
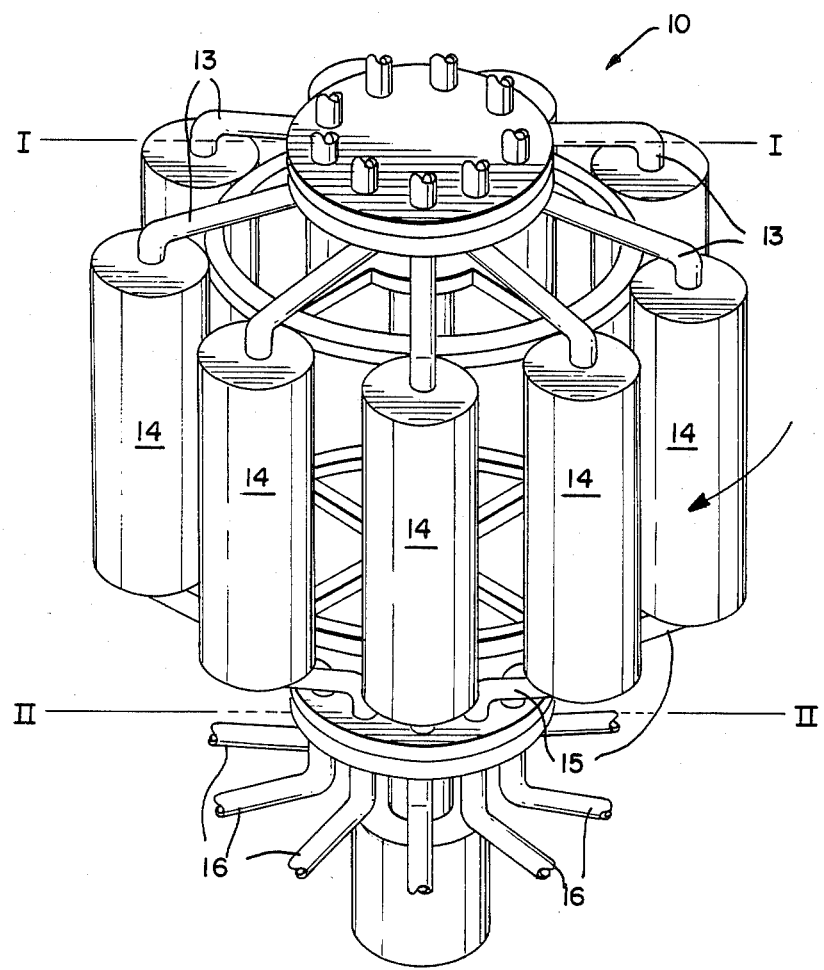
FIG. 2 is a perspective view of the Advanced Separation Device.

The ASD is illustrated in FIG. 2. It comprises a plurality of fixed feed ports 12, to each of which may be supplied various feed materials. In the case of the present invention, those materials include the acidic process waste water feed, the fluoride resin regeneration fluid, the fluoride-depleted waste water feed, the phosphate resin regeneration fluid and optionally, one or more wash water feed streams.

Moving about a circular path in periodic fluid communication with each of the above-described fixed feed ports, are a plurality of chambers 14 filled with the strong base ion exchange resin which interacts with the feed fluids. The effluent, i.e., the fluid which results from the interaction of the feed materials with the exchange material will hereinafter be referred to as the interaction product. In a process of the present invention, the strong base ion exchange resin is advantageously the TG550 resin manufactured by Dow Chemical Corp.

It will be appreciated that the feed materials are supplied continuously to the respective fixed feed ports 12 for periodic interaction with the resin in each of the chambers 14. In similar fashion, a plurality of fixed discharge ports 16 are provided at an end of the chambers opposite to that of the fixed feed ports 12. Each fixed feed port 12 has a corresponding fixed discharge port 16. After the interaction product passes through a given fixed discharge port, it may be purged from the system, recirculated back to a selected feed port, or a combination of both.

In order to carry out the process of the present invention, the acidic waste water feeds, the fluoride resin regeneration fluid, the phosphate resin regeneration fluid and the one or more wash water feed streams are each fed to given fixed feed ports so that the resin will be (i) loaded with the fluoride, (ii) washed, (iii) contacted with the fluoride resin regeneration fluid whereby the fluoride from the resin is exchanged with the anion in the fluid, (iv) re-washed, (v) contacted with the higher pH fluoride depleted waste water fluid whereby the resin is loaded with phosphate, (vi) rewashed, and then (vii) regenerated with a phosphate resin regeneration fluid which strips the phosphate from the resin and replaces it with an anion for subsequent processing.

Figure 3:
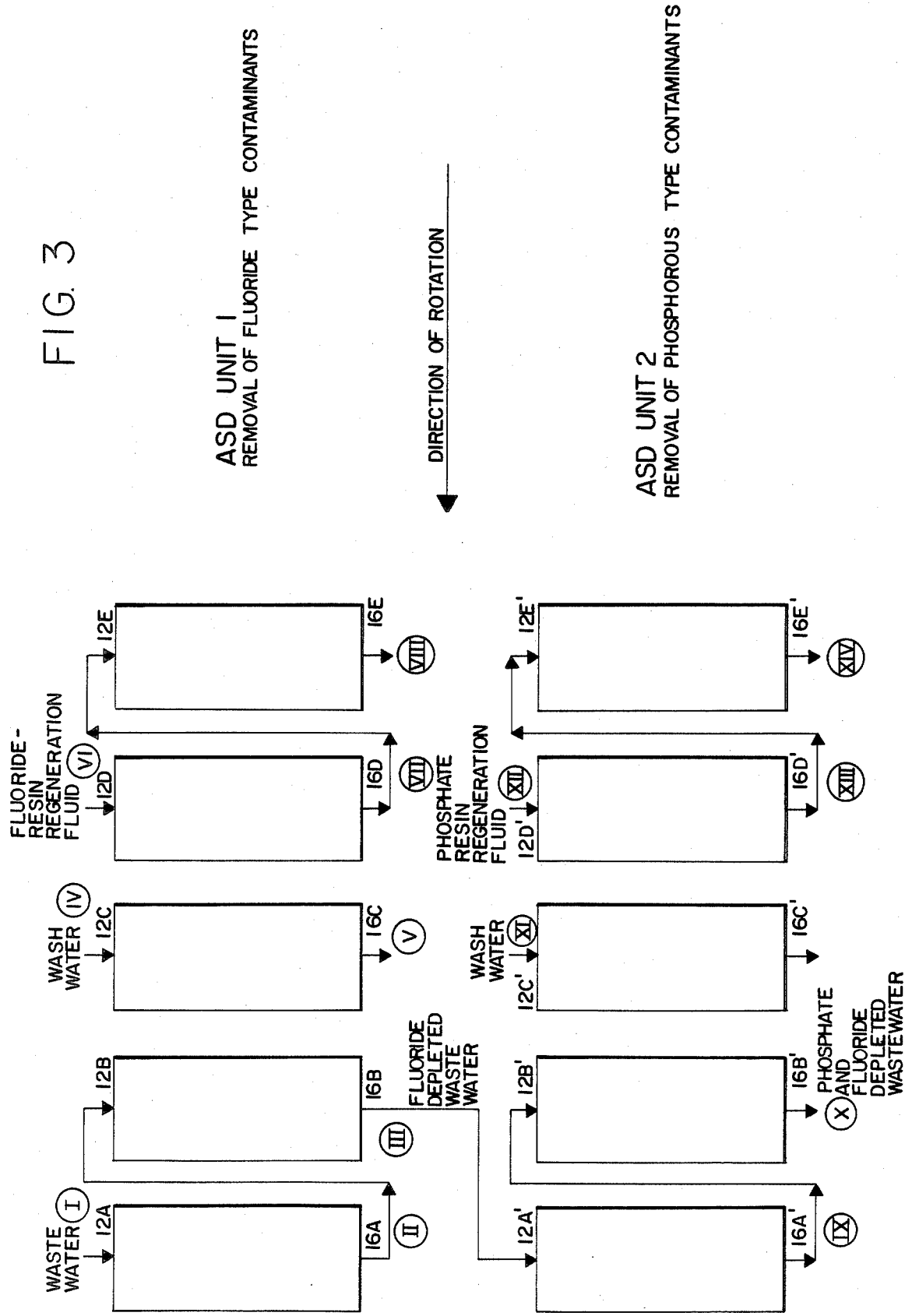
FIG. 3 is a schematic illustration of the overall process carried out in the Advanced Separation Device.

The process, carried out in conjunction with the ASD, is schematically illustrated in FIG. 3. After the waste water containing the fluoride and phosphorus-type contaminants has been clarified, it is sent as stream (I) to a fixed feed port 12A for delivery into the chambers containing the strong base ion exchange resin. The interaction product stream (II) containing depleted levels of fluoride ion is then discharged through port 16A and countercurrently circulated to another chamber 12B. By countercurrent circulation is meant that the interaction product discharged through fixed port 16A containing depleted levels of fluoride is circulated to a fixed feed port in a direction countercurrent to that of the direction of chamber rotation. In the present case, the stream (II) is fed countercurrently to fixed feed port 12B where it is delivered to the chambers filled with the resin to remove still more fluoride compound. Although only two fixed feed and discharge ports are employed in this example, it will be appreciated that more ports and chambers may be employed as required.

The effluent stream (III) discharged through fixed discharge port 16B is then directed to separate processing. The resin loaded with fluoride compound in the chambers is then washed and regenerated. More specifically, a wash water stream (IV) may be fed into one or more fixed feed ports 12C so as to remove residual amounts of soluble materials from the resin. The wash water effluent stream (V) discharged through fixed discharge port 16C is then returned to the waste water pond or incorporated into the strip solution depending on specific process requirements. The $SiF_6^{2-}$ is stripped from the strong base exchange resin by feeding a regeneration fluid stream (VI) such as ammonium bisulfate to fixed feed port 12D which forms ammonium silico-fluoride as well as a regenerated sulfate bound resin. As with the fluoride compound loading stage, the regeneration stage is most advantageously carried out when a countercurrent contacting technique is employed. Accordingly, the regeneration fluid containing about 0.5 to about 4 normal ammonium bisulfate at a pH ranging between about 2 and 4 is fed into fixed port 12D for delivery into the chambers. The effluent stream (VII), containing ammonium silico-fluoride and reduced levels of ammonium bisulfate is then fed countercurrently into fixed-feed portion 12E for delivery into yet another chamber. As with the fluoride loading stage, there may be additional fixed feed ports for delivery of still more regeneration fluid or of interaction product emanating from one of the fixed discharge ports.

The effluent stream (VIII), containing ammonium silico-fluoride is then further treated to recover valuable fluoride by-products such as calcium fluoride, hydrofluoric acid, metallic fluorides and the like. Specifically, the ammonum silicofluoride strip solution is first reacted with additional ammonia so as to increase its pH to between about 8.5 and 9.0 and effect precipitation of an activated silica compound. This silica s then filtered, washed and dried for subsequent sale.

Alternatively, the acidity of the ammonium silico-fluoride/ammonium bisulfate solution can be increased by adding sulfuric acid to the stream thereby stripping the silicofluoride portion therefrom in the form of a gas. The silico-fluoride containing gas is then scrubbed using conventional equipment to produce a solution containing $SiF_6^{2-}$ which can be still further treated to produce an intermediate of ammonum fluoride. The resulting ammonium fluoride solution may then be used as an intermediate for any number of fluoride compounds including those identified above.

The fluoride-depleted waste water stream (III) discharged through fixed discharge port 16B is first sent to a mix tank where enough lime or other alkaline material is added so as to raise the pH to between about 5.0 and 7.0. Since substantially all the fluoride ion contained in the waste water is removed in the previously described step, a far smaller amount of lime is required to raise the pH than would be required if the fluoride ion were still present. This serves to significantly reduce the water treatment costs involved.

The pH adjusted water is then sent to a second clarifier to remove lime solids which themselves may be recycled to the liming system. The clarified water, having a pH ranging between about 5.0 and 7.0, is then sent to a second ASD unit which is also loaded with a strong base ion exchange resin. At the higher pH levels reached after the second liming stage, the resin has an affinity for the phosphate anion. The fluoride-depleted water is then sent to fixed port 12A' of the second ASD where it is contacted with the resin in a countercurrent fashion as was done previously. Thus, the interaction product stream (IX) discharged through a first discharge port 16A' is directed countercurrently to a second feed port 12B' for further contacting with the strong base ion exchange resin. In similar fashion to the operation of the first ASD, there may be provided additional fixed feed and discharge ports for further contactng of the waste water and the exchange resin. The resulting effluent stream is at a near neutral pH and contains only very small amounts of fluoride and phosphorus-type compounds.

The resulting effluent stream (X) is now at a near neutral pH and contains only residual amounts of fluoride and phosphorus. The material can advantageously be recycled through an existing operation for use as process make-up water. An ideal application is as make-up water for wet-rock grinding circuits. In this manner, wet-rock grinding can be utilized in the phosacid complex with no impact on the overall water balance.

The spent resin, now loaded with phosphate, is then washed with a wash water stream (XI) as previously described and then regenerated with a material which will exchange an anion for the phosphate bound to the resin. Ammonium hydroxide has been found ideal for this purpose. Accordingly, a 1 to 10% solution of ammonium hydroxide is fed as stream (XII) into fixed feed port 12D' for contact with the phosphate loaded resin. Once again, a counter-current contacting approach is most advantageous. Thus, the interaction stream (XIII) discharged through fixed discharge port 16D' is fed into fixed feed port 12E' where further exchange of hydroxide with phosphate occurs. The interaction product stream (XIV) which comprises a fairly concentrated aqueous stream of ammonium phosphate is recycled to the chemical plant and utilized as make-up in the production of granular ammoniated phosphate fertilizers. It will be appreciated that any $P_2O_5$ values recovered in this manner have the same equivalent value to the phosphoric acid process as the phosphoric acid used in fertilizer production and thus the overall phosphate recovery for the complex is increased.

With the above process, it is possible to treat waste waters containing up to 20,000 ppm $SiF_6^{2-}$ and up to 20,000 ppm phosphate in a continuous and efficient manner. The final treated effluent streams will have contaminant concentrations below about 100 ppm.

The following example is given by way of illustration and should no way be viewed as limiting the process presently disclosed and claimed. Thus, although the exemplary process is carried out in two separate ASD units namely, one for fluoride removal and one for phosphate removal, both steps may also advantageously be carried and in a single ASD.

EXAMPLE

The process for removing fluoride compounds such as $SiF^{2-}$ from the waste water was carried out in the ASD unit. The ASD comprised 30 individual rotating chambers 2 inches in diameter. Each chamber contained approximately 16 to 18 inches of DOWEX MSA-1 strong base ion exchange resin manufactured by Dow Chemical Corp. The unit was rotated at a rate of about 60 minutes per revolution and the process was carried out at room temperature. The ASD also had 20 fixed feed and discharge ports. A flow diagram for the fluoride recovery scheme is shown in FIG. 4.

The waste water, which had a pH of about 1.8, was first fed into a conventional valved clarifier whereby solids were removed. The clarified water was then sent to the ASD where it was delivered to the resin-filled chamber for interaction with the resin.

Figure 4:
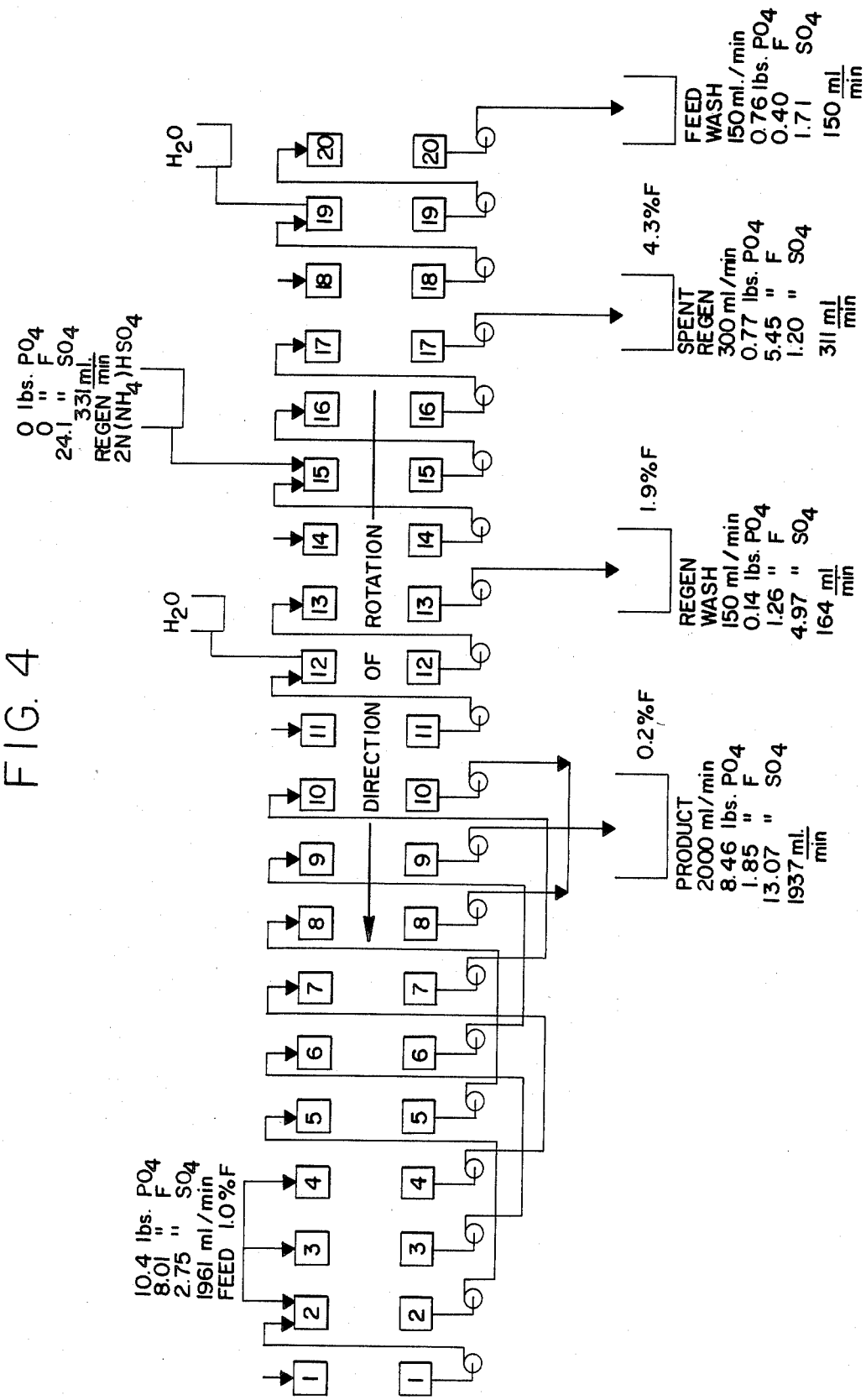
FIG. 4 is a flow diagram of the fluoride recovery process carried out in the Advanced Separation Device.

As illustrated in FIG. 4, the feed was fed in parallel to fixed feed ports 2, 3 and 4 for interaction with the DOWEX MSA-1 resin whereby fluoride compounds such as $SiF_6^{2-}$ contained in the feed were adsorbed onto the resin. The feed contained 10.4 lbs. phosphate, 8.01 lbs. fluoride compound and 2.75 lbs. sulfate and was fed into the fixed feed ports at the rate of 1061 mL/min.

The interaction product discharged from fixed discharge ports 2, 3 and 4 was countercurrently circulated to fixed feed ports 5, 6 and 7 respectively whereby additional fluoride compound from the waste water was adsorbed and a second interaction product discharged from fixed discharge ports 5, 6 and 7. The three streams containing the second interaction product discharged from fixed discharge ports 5, 6 and 7 were then fed into the three fixed feed ports 8, 9 and 10 whereby a third interaction product was produced and discharged from fixed discharge ports 8, 9 and 10. The third interaction product discharged from fixed discharge ports 8, 9 and 10 was removed from the ASD system as a product stream at the rate of 1937 mL/min. That product stream contained 8.46 lbs. phosphate, 1.85 lbs. fluoride compound and 13.07 lbs. sulfate.

The resin, now having fluoride compounds such as $SiF_6^{2-}$ bound thereto, was then washed by feeding fresh water at the rate of about 1 gpm/ft$^2$ into the fixed feed port 19. The wash water effluent was discharged from the fixed discharge port 20 at the rate of 150 mL/min. and returned to the pond system. It contained about 0.76 lbs. phosphate, 0.40 lbs. fluoride compound and 1.71 pounds of sulfate.

The washed $SiF_6^{2-}$ loaded resin was then regenerated by feeding a 2 Normal ammonium bisulfate regeneration solution into fixed feed port 15 for interaction therewith. The regeneration solution contained 24.1 lbs. of the bisulfate and was fed into the fixed feed port 15 at the rate of 331 mL/min. The first interaction product of the bisulfate regeneration solution was then fed countercurrently and in series through fixed feed ports 16 and 17 to produce second and third interaction products. The third interaction product discharged from fixed discharge port 17 was removed from the ASD system as a spent regeneration solution at the rate of 311 mL/min. That spent regneration solution was an ammonium silico-fluoride containing 0.77 lbs. phosphate, 5.45 lbs. fluoride compound and 1.20 lbs. sulfate which translates into 4.3% by weight of the fluoride compound in the solution.

The regenerated bisulfate resin was then washed by feeding water into the fixed feed port 12 of the ASD, the interaction product of which was countercurrently circulated and discharged at the rate of 164 mL/min. as a regeneration wash solution through fixed discharge port 13. That regeneration wash solution contained 0.14 lbs. phosphate, 1.26 lbs. fluoride compound and 4.97 lbs. of sulfate.

The ammonium silico-fluoride strip solution discharged from fixed dishcarge port 17 (as described above) was reacted in a stirred tank reactor with enough additional ammonia to increase the pH thereof to about 8.5 thereby forming a solution containing ammonium fluoride and an activated silica compound. After filtering out the activated silica using a filter press, centrifuge, belt filter or the like, the ammonium fluoride solution was sent on for further processing.

The phosphate removal step is then carried out. The waste water stream discharged from the fixed discharge ports 8, 9 and 10 and containing depleted levels of fluoride, is sent to a mix tank such as an agitated baffled tank where it is combined with enough lime so as to raise the pH thereof to between about 5 and 7. After passing through a conventional valved clarifier to remove residual lime solids, the water is then sent to the ASD. The ASD employed may be of the same construction as that used in the $SiF_6^{2-}$ loading stage. Additionally, the same countercurrent circulation of materials can be employed.

Thus, the fluoride depleted waste water is fed into a first fixed port for interaction with the strong base ion exchange resin so as to form an interaction product containing reduced levels of phosphate. This first interaction product is then sent to a second fixed feed port for delivery into the resin filled chambers whereby a second interaction product containing further depleted levels of phosphate is obtained and in turn fed to a third fixed feed port to produce a final product containing less than 100 ppm phosphate as $P_2O_5$. The treated water is then sent to the plant for reuse in various processes.

As with the fluoride loading stage, the potassium loaded resin is first washed with about 1 gpm/ft² of a wash water stream which is fed into a washing stage fixed feed port. The effluent discharged from the fixed washing stage discharge port is sent to the existing pond system.

Finally, the phosphate loaded resin s regenerated by feeding 1 to 10% of an ammonium hydroxide solution to a first fixed regeneration feed port for delivery into the chambers containing the phosphate-loaded resin. An exchange of hydroxide for phosphate occurs so as to yield a first regeneration interaction product. This first regeneration interaction product is then circulated countercurrently to a second fixed regeneration fluid feed port where it again is delivered to the chambers for interaction with the strong base ion exchange resin. The second regeneration interaction product, containing from 5 to 10% phosphate as $P_2O_5$ is then returned to the fertilizer plant for further processing.

As with the fluoride removal in the first ASD, the phosphate removal in the second ASD may likewise be carried out by feeding several streams in parallel to fixed feed ports of the ASD, the interaction product streams then being fed countercurrently in parallel to three additional fixed feed ports of the ASD.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A process for treating an acidic process waste water containing $SiF_6^{2-}$ comprising (i) contacting said waste water with a strong base ion exchange resin and loading said $SiF_6^{2-}$ onto the resin and (ii) removing phosphate ions from said waste water after removing said fluoride-containing ions from the waste water, said phosphate ions being removed by raising the pH of said waste water to between about 5.0 and 7.0 and then contacting said waste water with a strong base ion exchange resin and loading said phosphate ions onto said resin.

2. The process of claim 1 wherein the pH of the waste water is from about 1.5 to about 2.0.

3. The process of claim 1 further including the step of regenerating the strong base ion exchange resin with a compound which strips the $SiF_6^{2-}$ from the resin to form a water-soluble salt therewith.

4. The process of claim 1 wherein said acidic process wastewater contains fluoride comprised primarily of $SiF_6^{2-}$, phosphate and sulfate.

5. A process for treating an acidic process waste water containing $SiF_6^{2-}$ comprising the steps of:
  (A) providing an Advanced Separation Device having:
    (i) at least two fixed waste water feed ports and at least one fixed regeneration fluid feed port or at least one fixed waste water feed port and at least two fixed regeneration fluid feed ports as well as corresponding waste water and regeneration fluid discharge ports;
    (ii) a plurality of chambers filled with a strong base ion exchange resin, said chambers being disposed between and moving about a circular path in periodic fluid communication with said fixed feed and discharge ports;
  (B) supplying said acidic process waste water containing $SiF_6^{2-}$ to said at least one fixed waste water feed port of said Advanced Separation Device for delivery into said chambers containing said strong base ion exchange resin and loading the $SiF_6^{2-}$ onto said resin so as to produce a first interaction product containing depleted levels of $SiF_6^{2-}$ which is discharged through said at least one fixed waste water discharge port;
  (C) supplying a regeneration fluid to said at least one fixed regeneration fluid feed port for delivery into said chambers containing resin loaded with $SiF_6^{2-}$ and stripping the $SiF_6^{2-}$ from said resin to form a water soluble salt therewith which is discharged through said at least one fixed regeneration fluid discharge port, the interaction product discharged from said first or additional waste discharge ports or the water soluble salt discharged from said first or additional regeneration fluid discharge ports being circulated countercurrently to a succcessive waste water or regeneration fluid feed port.

6. A process for treating an acidic process waste water containing $SiF_6^{2-}$ and phosphate anion comprising the steps of:
  (A) providing first and second Advanced Separation Devices having:
    (i) at least one fixed waste water feed port and at least one fixed regeneration fluid feed port as well as corresponding waste water and regeneration fluid discharge ports;
    (ii) a plurality of chambers filled with a strong base ion exchange resin, said chambers being disposed between and moving about a ciruclar path in periodic fluid communication with said fixed feed and discharge ports;
  (B) supplying said acidic process waste water having a pH of between about 1.5 and 2.0 to said at least one fixed waste water feed port of said first Advanced Separation Device for delivery into said chambers containing said strong base ion exchange resin and loading the $SiF_6^{2-}$ onto said resin so as to produce at least a first interaction product containing depleted levels of $SiF_6^{2-}$ which is discharged through said at least one fixed waste water discharge part;
  (C) supplying a first reqeneration fluid to said at least one fixed rgeneration fluid feed port of said first Advanced Separation Device for delivery into said chambers containing resin loaded with $SiF_6^{2-}$ and stripping the $SiF_6^{2-}$ from said resin to form a water soluble salt therewith, which is discharged through said at least one fixed regeneration fluid discharge part;
  (D) raising the pH of the interaction product discharged from said at least one fixed waste water discharge port of said first Advanced Separation Device to between about 5.0 and 7.0 to form a second waste water feed;

(E) supplying said second waste water feed to said at least one fixed waste water feed port of said second Advanced Separation Device for deivery into said chambers containing said strong base ion exchange resin, which is identical or different to the strong base ion exchange resin of said first Advanced Separation Device, and loading the phosphate anion onto said resin to prodcue at least a first phosphate interaction product containing depleted levels of phosphate which is discharged through said at least one fixed waste water discharged port;

(F) supplying a second regeneration fluid to said at least one fixed regeneration fluid feed port of said second Advanced Separation Device for delivery into said chambers containing resin loaded with phosphate anion and stripping the phosphate anion from said resin to form a water soluble salt therewith, which is discharged from said at least one fixed regeneration fluid discharge port of said second Advanced Separation Device.

7. The process of claim 6 wherein said first regeneration fluid includes a compound which forms a water-soluble salt with the $SiF_6^{2-}$ loaded onto said strong base ion exchange resin.

8. The process of claim 7 wherein said compound which forms a water soluble salt with $SiF_6^{2-}$ is sulfuric acid, ammonium sulfate or ammonium bisulfate.

9. The process of claim 8 wherein said compound is ammonium bisulfate which strips said $SiF_6^{2-}$ from said strong base ion exchange resin to form ammonium silico-filuoride.

10. The process of claim 9 further including the step of reacting sid ammonium silico-fluoride strip solution with additional ammonia to a pH between about 8.5 and 9.0 and precipitating an activated silica compound.

11. The process of claim 6 wherein said second regeneration fluid includes a compound which forms a water-soluble salt with the phosphate anion loaded onto said second strong base ion exchange resin.

12. The process of claim 11 wherin said compound which forms a water-soluble salt with phosphate anion is ammonium sulfate, ammonium hydroxide or sodium sulfate.

13. The process of claim 12 wherein said compound is ammonium hydroxide.

14. The process ofclaim 6 further including the step of clarifying said acidic process waste water prior to supplying said waste water to said first or second Advanced Separation Device.

15. The process of claim 6 wherien said first and/or said second Advanced Separation Devices include at least two fixed waste water feed ports and corresponding fixed waste water discharge ports or at least two fixed regeneration fluid feed ports and corresponding regeneration fluid discharge ports, the interaction products discharged from said first or additional fixed discharge ports being circulated coutercurrently to a successive waste water or regeneration fluid feed port.

16. A process for treating an acidic process waste water containing $SiF_6^{2-}$ comprising the steps of:

(A) providing an Advanced Separation Device having:
(i) at least one fixed waste water feed port and at least one fixed regeneration fluid feed port as well as corresponding waste water and regeneration fluid discharge ports;

(ii) a plurality of chambers filled with a strong base ion exchange resin, said chambers being disposed between and moving about a circular path in periodic fluid communication with said fixed feed and discharge ports;

(B) supplying said acidic process waste water containing $SiF_6^{2-}$ to said at least one fixed waste water feed port of said Advanced Separastion Device for delivery into said chambers containing said strong base ion exchange resin and loading the $SiF_6^{2-}$ onto said resin so as to produce a first interaction product containing depleted levels of $SiF_6^{2-}$ which is discharged through said at least one fixed waste water discharge port;

(C) supplying a regeneration fluid comprising sulfuric acid, ammonium sulfate or ammonium bisulfate to said at least one fixed rgeneration fluid feed port for delivery into said chambers containing resin loaded with $SiF_6^{2-}$ and stripping the $SiF_6^{2-}$ from said resin to form a water soluble salt therewith which is discharged through said at least one fixed regeneration fluid discharge port.

17. The process of claim 16 wherein said compound is ammonium bisulfate which strips said $SiF_6^{2-}$ from said strong base ion exchange resin to form ammonium silico-fluoride.

18. The process of claim 17 further including the step of reacting said ammonium silico-fluoride strip solution with additional ammonia to a pH of between about 8.5 and 9.0 and precipitating an activated silica compound.

19. A process for treating an acidic process waste water containing $SiF_6^{2-}$ and phosphate anions comprising the steps of:

(A) providing an Advanced Separation Device having:
(i) at least one fixed waste water feed port, at least one fixed regeneration fluid feed port, at least one fixed phosphate waste water feed port and at least one fixed phosphate rgeneration fluid feed port as well as corresponding fixed waste water, regeneration fluid, phosphate waste water and phosphate regeneration fluid discharge ports;
(ii) a plurality of chambers filled with a strong base ion exchange resin, said chambers being disposed between and moving about a circular path in periodic fluid communication with said fixed feed and discharge ports;

(B) supplying said acidic process waste water containing $SiF_6^{2-}$ to said at least one fixed waste water feed port of said Advanced Separation Device for delivery into said chambers containing said strong base ion exchange resin and loading the $SiF_6^{2-}$ onto said resin so as to produce a first interaction product containing depleted levels of $SiF_6^{2-}$ which is discharged through said at least one fixed waste water discharge port;

(C) raising the pH of the waste water containing depleted levels of $SiF_6^{2-}$ discharged from said waste water discharge port of step (B) to between about 5.0 and 7.0 to form a second waste water feed;

(D) supplying said second waste water feed to said at least one fixed phosphate waste water feed port for delivery into said chambers containing said strong base ion exchange resin and loading the phosphate anion onto said resin to produce at least a first phosphate interaction product containing depleted levels of phosphate which is discharged through said at least one fixed phosphate waste water discharge port;

(E) supplying a second regeneration fluid to said at least one fixed phosphate regeneration fluid feed port for delivery into said chambers containing said resin loaded with phosphate anion and stripping the phosphate anion from said resin to form a water soluble salt therewith, which is discharged from at least one fixed phosphate regeneration fluid discharge port;

(F) supplying a regeneration fluid to said at least one fixed regeneration fluid feed port for delivery into said chambers containing the resin loaded with $SiF_6^{2-}$ and stripping the $SiF_6^{2-}$ from said resin to form a water soluble salt therewith which is discharged through said at least one fixed regeneration fluid discharge port.

20. A process for treating an acidic process waste water containing fluride comprised primarily of $SiF_6^{2-}$, phosphate and sulfate comprising the steps of:

(A) providing an Advanced Separation Device having:
  (i) at least one fixed waste water feed port and at least one fixed regeneration fluid feed port as well as corresponding waste water and regeneration fluid discharge ports;
  (ii) a plurality of chambers filled with strong base ion exchange resin, said chambers being disposed between and moving about a circular path in periodic fluid communication with said fixed feed and discharge ports;

(B) supplying said acidic process waste water containing $SiF_6^{2-}$ to said at least one fixed waste water feed port of said Advanced Separation Device for delivery into said chambers containing said strong base ion exchange resin and loading the $SiF_6^{2-}$ onto said resin so as to produce a first interaction product containing depleted levels of $SiF_6^{2-}$ which is discharged through said at least one fixed waste water discharge port;

(C) supplying a regeneration fluid to said at least one fixed regeneration fluid feed port for delivery into said chambers containing resin loaded with $SiF_6^{2-}$ and stripping the $SiF_6^{2-}$ from said resin to form a water soluble salt therewith which is discharged through said at least one fixed regeneration fluid discharge port.

* * * * *